Jan. 7, 1936.  A. C. GILBERT ET AL  2,027,036
KITCHEN UTILITY DEVICE
Filed Jan. 9, 1934  6 Sheets-Sheet 1

Jan. 7, 1936.  A. C. GILBERT ET AL  2,027,036
KITCHEN UTILITY DEVICE
Filed Jan. 9, 1934   6 Sheets-Sheet 2

Jan. 7, 1936.  A. C. GILBERT ET AL  2,027,036
KITCHEN UTILITY DEVICE
Filed Jan. 9, 1934   6 Sheets-Sheet 3

Inventors
Alfred C. Gilbert,
Shirley P. Morse,
Rockwood Burton
By
Attorneys

Jan. 7, 1936.  A. C. GILBERT ET AL  2,027,036
KITCHEN UTILITY DEVICE
Filed Jan. 9, 1934  6 Sheets-Sheet 4

Inventors
Alfred C. Gilbert
Shirley P. Morse
By Rollin ... 
Attorney

Jan. 7, 1936.  A. C. GILBERT ET AL  2,027,036
KITCHEN UTILITY DEVICE
Filed Jan. 9, 1934  6 Sheets-Sheet 5

Inventors
Alfred C. Gilbert
Shirley P. Morse
Roscure Batchelor
By
Attorneys

Jan. 7, 1936. A. C. GILBERT ET AL 2,027,036
KITCHEN UTILITY DEVICE
Filed Jan. 9, 1934 6 Sheets-Sheet 6

Patented Jan. 7, 1936

2,027,036

UNITED STATES PATENT OFFICE 2,027,036

KITCHEN UTILITY DEVICE

Alfred C. Gilbert, North Haven, and Shirley P. Morse, East Haven, Conn., assignors to The A. C. Gilbert Company, New Haven, Conn.

Application January 9, 1934, Serial No. 705,876

24 Claims. (Cl. 259—84)

This invention relates to electric motor operated kitchen utility devices for mixing, beating and extracting edible products.

One object of the invention is to provide an improved structure of electrically driven agitators and juice reamer.

Our invention pertains especially to that class of devices in which a so-called power shaft is employed having a socket or outlet associated therewith for the connection of various appliances such as food choppers, coffee grinders, ice cube breakers, and the like, and we have particularly in view the provision of a compact, powerful and efficient device having mixing or beating agitators, a juice reamer, and a power shaft.

We also aim to provide improved means for driving the power shaft.

Another object is to provide a device in which the agitators can be moved relatively to the mixing bowl into the most satisfactory and convenient location.

Another purpose which we have is to provide a structure in which the agitator or agitators is or are tiltably mounted relatively to the bowl and in which an agitator when lifted up out of the bowl is moved somewhat to one side as a result of the tilting operation so as to leave the bowl more accessible from the top than in the prior art devices of this general class.

To these and other ends the invention consists in the novel features and combinations of parts to be hereinafter described and claimed.

In its general features the device particularly selected for illustration and description comprises a base adapted to support a rotary turntable on which a mixing bowl is placed; a pedestal rising from the base; a bracket pivoted to the pedestal in a position to overhang the base; an electric motor supported on top of the bracket; a gear case and gearing supported from the outer end of the motor; agitator shafts depending from the gear case and adapted to extend down into the mixing bowl to stir its contents; an extractor or reamer shaft extending upwardly from the gear case and adapted to drive a reamer located in a juice collecting and delivering bowl; and a power shaft having a power socket or outlet associated therewith, which power shaft is driven by the gearing in the gear casing at a reduced speed and is adapted to operate food choppers and like appliances which require considerable power.

In the example selected for illustration the base is indicated generally at A, the pedestal at B, the motor bracket at C, the motor at D, the gear case or housing containing the gearing at E, the depending agitators at F, the fruit reamer at G, the juice collecting bowl at H, and the power socket at I.

The base A may advantageously have a round portion 30 connected with the pedestal B by a portion 31 of reduced width. In the center of the round portion 30 is a socket having an anti-friction bearing 32 adapted to receive the spindle member 33 of a removable turntable 34, which receives a mixing bowl 35. The beaters 36 on the lower ends of the agitators F extend down into this mixing bowl.

At the top of the pedestal B the bracket C is pivoted to tilt on a pivot pin 37. This pin is located in a fork 38 projecting upwardly from a platform 39 having a swiveled relation to the pedestal. This platform is provided with a depending shank or trunnion 40 fitting a cylindrical socket 41 in the upper end of the pedestal. For holding the trunnion 40 in the socket a screw 42 is employed which is screwed into the lower end of the trunnion. Between the head of this screw and the body portion of the upper pedestal end are washers 43 and a cap piece 44, the arrangement being such that by screwing up screw 42 the platform 30 is brought against the upper face 45 of the pedestal with the required amount of friction. The pedestal B is hollowed out at 46 and the screw 42 is located in this hollowed out portion and is accessible from the bottom of the pedestal.

Figures 4, 6, 10, 21:
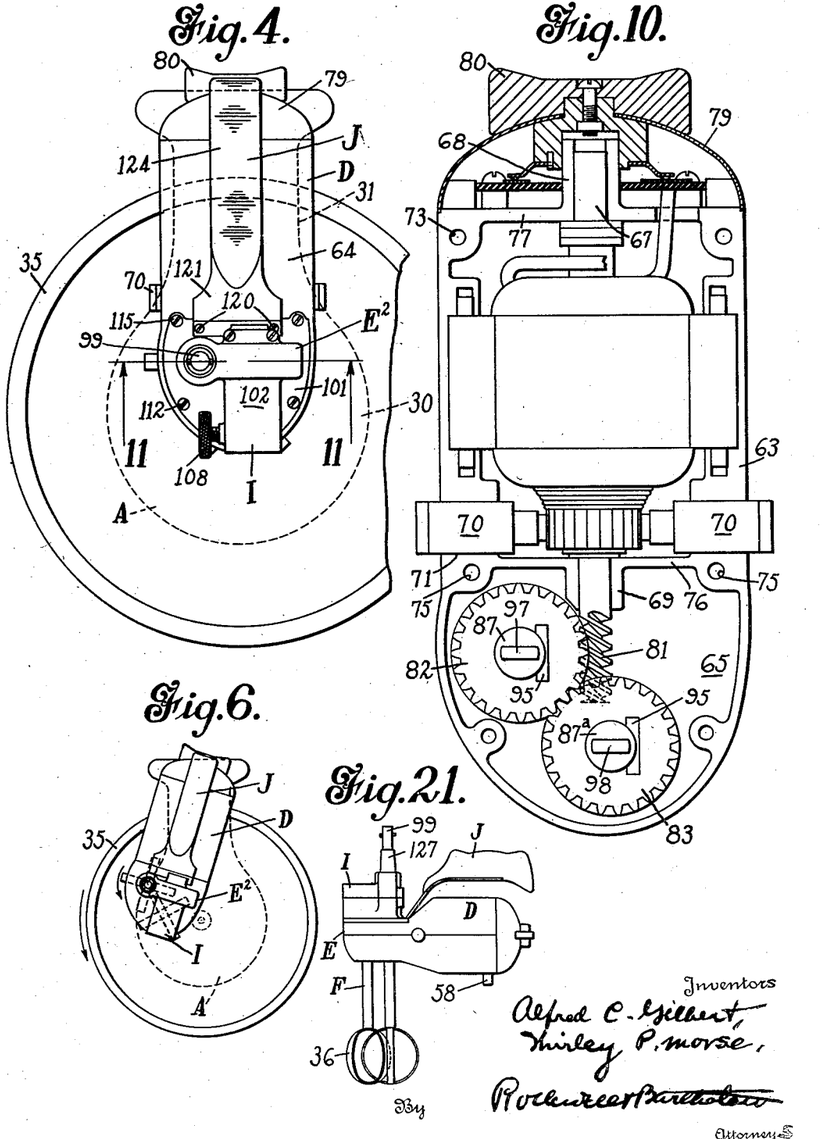
Fig. 4 is a top plan view of the device without the fruit reamer and juice collecting bowl and with the mixing bowl partially broken away.
Fig. 6 is a top plan view of the parts shown in Fig. 5, this view being on a somewhat smaller scale.
Fig. 10 is an enlarged section on line 10—10 of Fig. 1.
Fig. 21 is a side elevation of the motor unit on a small scale showing it removed from the pedestal.
Figure 7:
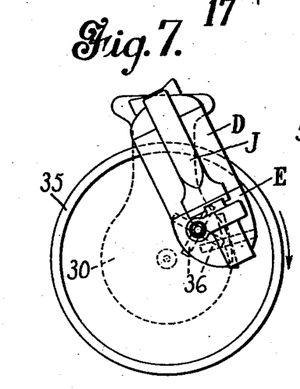
Fig. 7 is a view similar to Fig. 6 but showing the agitators swung to the opposite side of the bowl.
Figure 18:
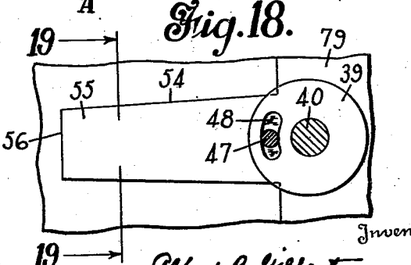
Fig. 18 is a section on line 18—18 of Fig. 1.
Figure 22:
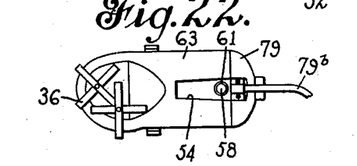
Fig. 22 is a bottom plan view of the structure shown in Fig. 21.

Projecting upwardly from the face 45 at the upper end of the pedestal is a short pin 47 which projects into an arcuate groove 48 on the lower face of member 39, as shown more particularly in Fig. 18. By this means the swivel movement of the motor relatively to the pedestal is limited. In the preferred practice of our invention the motor can be swung either to the right or left of the position shown in Fig. 4, in which it is alined with the base, the movement to the left being illustrated in Fig. 6 and the movement to the right being illustrated in Fig. 7. Movement beyond the positions shown in Figs. 6 and 7 is prevented by the ends of the groove 48 coming up against the pin 47.

In front of the pivot pin 37 the bracket member C is provided with a depending stop screw or member 49 clamped in place by a nut 50. The head of the screw 49 is adapted to abut the upper surface of platform 39 in order to limit the downward movement of the beaters into the receptacle on the base. By adjustment of the screw 49 in its threaded socket 51, the height of the beaters may be adjusted. In order to limit the extent to which the motor member may be tilted upwardly, a suitable stop mechanism is provided. We prefer to form this stop means by providing an upwardly projecting abutment 52 on the upper surface of platform 39, which abutment is adapted to be contacted by a shoulder 53 on the under surface of the bracket within the mounting fork 38. When the motor is tilted upwardly to the position shown in Fig. 9, wherein the beaters are raised above the upper edge of the mixing bowl, the shoulder 53 comes against the rear face of the abutment or lug 52.

Figures 2, 3, 20:
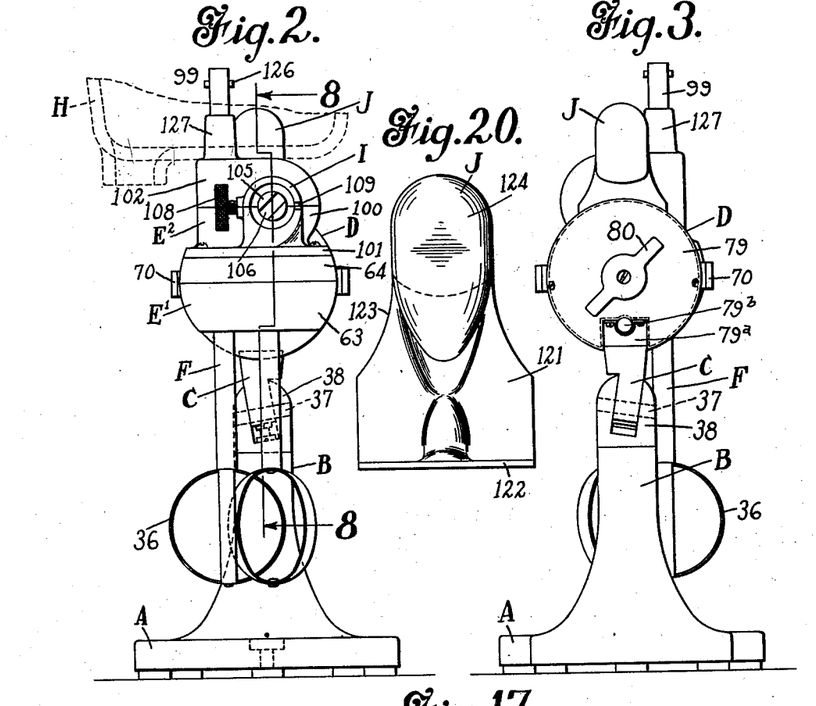
Fig. 2 is a front elevation of the device shown in Fig. 1 with the mixing bowl and the fruit reamer removed, and the juice bowl partially shown in dotted lines.
Fig. 3 is a rear end elevation of the structure shown in Fig. 2.
Fig. 20 is a detail front elevation of the handle member.

For reasons hereinafter stated, the pivot pin 37 is not horizontal but is somewhat inclined with respect to a horizontal plane, as shown more particularly in Fig. 3. When viewed from the rear, as in Fig. 3, it is preferred to have the right-hand end of the pivot pin at a somewhat lower level than the left-hand end of the pin.

The motor member D is readily separable from the bracket C and preferably can be separated from the bracket merely by lifting the motor member. The motor member can be lifted by means of a handle member J. In the structure which we prefer to employ the lower face of the motor member casing is provided with a shallow groove or mortise 54 adapted to be engaged by a tongue 55 projecting forwardly from bracket C. Preferably the tongue 55 has straight sides which converge slightly toward the front end, and the front extremity of the tongue is squared off, as shown at 56. The upper surface of the tongue 55 is preferably flat. This tongue is preferably located wholly in advance of the pivot, the rear portion of the tongue merging into a rounded surface 57 at the upper part of the bracket. The mortise 54 in the lower part of the motor casing is shaped to fit the tongue 55. Near the rear end of the tongue a projection such as a pin is used to prevent movement of the motor member relatively to the bracket except by the upward vertical movement of the motor member. This pin may advantageously be located on the motor mmeber and may project downwardly from said member, as shown at 58. This pin projects downwardly beyond the lower face of the motor casing to a certain extent and is received in a closely fitting cylindrical socket 59 in the upper face of the bracket. The socket 59 may advantageously be counterbored, as shown at 60, to receive an enlarged shouldered part 61 of cylindrical formation adjacent the junction of the pin 58 with the motor casing. The connection between the motor member and its support is such that the former is freely liftable in a substantially vertical direction at all times, no unfastening being required as a preliminary to the lift.

Figures 1, 19:
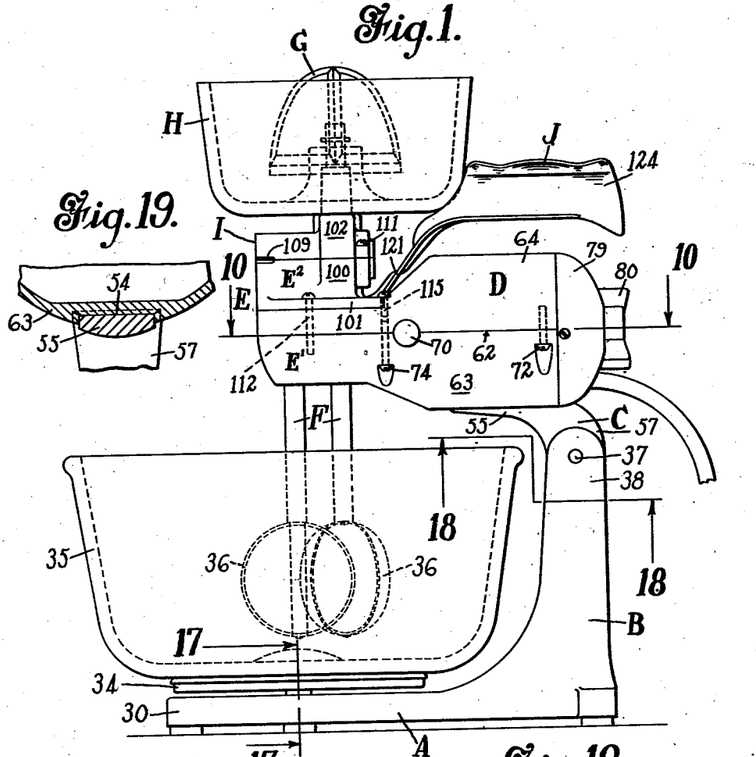
Fig. 1 is a side elevation of a kitchen utility device embodying our improvements, showing the mixing bowl in position on the turntable and with the fruit reamer and fruit juice collecting bowl in operative position.
Fig. 19 is a section on line 19—19 of Fig. 18.
Figure 14:
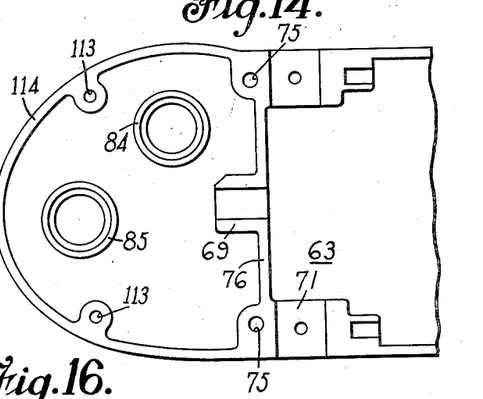
Fig. 14 is a fragmentary detail view of the lower member of the combined motor and gear casing.

In the form shown in Fig. 1 the gear casing or housing E consists of two principal parts, a lower section E¹ being formed in one piece with the casing of the motor D, and an upper section E² being attached to section E¹ at the upper part thereof. The casing which encloses the electric motor K is extended integrally forward to form the housing E¹ for the gears which drive the agitators F. The combined motor and gear case is divided horizontally and longitudinally along the line 62 shown in Fig. 1, and the lower member 63 of this casing is shown, for example, in Fig. 10. Fig. 14 shows the front end portion of this member with the motor and gear parts removed. The upper member 64 of the combined motor and gear case is generally similar to the lower member but in particular it may be noted that the gear housing portion 65 of the lower member is somewhat deeper than the gear housing portion 66 of the upper member. The motor K has an armature shaft 67 provided with a bearing 68 formed partly in member 63 and partly in member 64, and at its forward end the motor shaft has a bearing 69 formed partly in the lower section of the case and partly in the upper section thereof. The brushes 70 of the motor are received in semi-cylindrical sockets 70 71 at the meeting edges of the casing sections. The two parts of the casing are movably secured together by screws 72 extending through holes 73 at the rear corners of the casing member 63 into threaded sockets in the upper casing member 64, and there are also similar screws 74 passing through holes 75 in the lower casing section and into threaded sockets in the upper casing section, these screw holes and screw sockets being somewhat in advance of the partition 76, 76ᵃ which divides the gear casing portion from the motor casing portion, the partition part 76 being in the lower section of the combined case and the partition part 76ᵃ being in the upper section thereof. The rear wall of the motor casing is formed partly by a wall 77 on the lower casing section and partly by a wall 78 on the upper casing section. A shell-like member 79 is extended over the rear end portion of the motor to form a housing for a suitable switch mechanism, including a thumb button 80 projecting rearwardly from the motor and by the rotation of which the motor can be started and stopped and its speed of rotation varied. The shell 79 has a grooved or cut away portion 79ᵃ at the lower part thereof where it is adjacent bracket C. In this cut away portion the conductor cord 79ᵇ is received.

Figure 11:
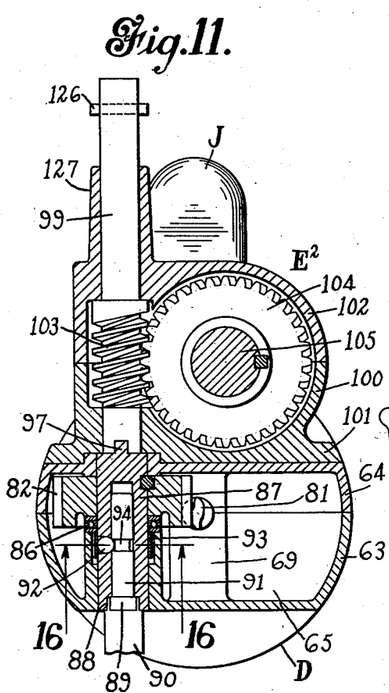
Fig. 11 is an enlarged section on line 11—11 of Fig. 4 illustrating the gearing for driving the reamer shaft and power shaft.
Figure 12:
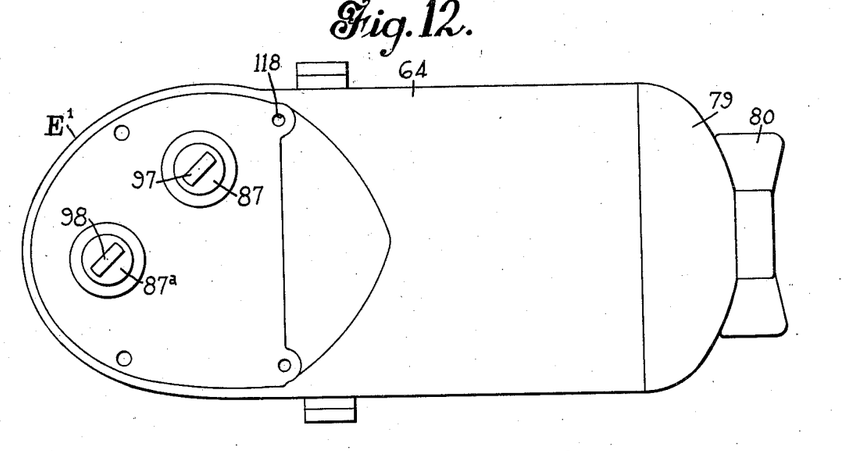
Fig. 12 is an enlarged plan view of the motor and gear casing, the reamer shaft and power shaft being removed.
Figure 13:
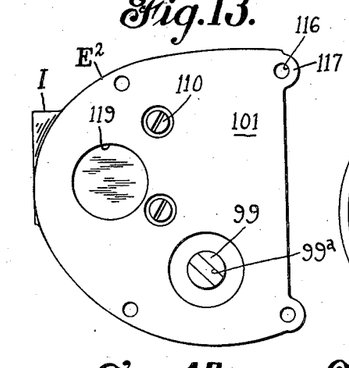
Fig. 13 is a bottom plan view of the casing carrying the reamer shaft and power shaft.

The motor shaft 67 is extended within the gear compartment of the casing and is there provided with a worm 81 which is preferably cut directly in the material of the motor shaft. This worm 81 drives a gear 82 which is preferably a helical gear, and gear 82 in turn drives a gear 83, which is also preferably a helical gear. Gear 82 is supported on top of a sleeve 84 projecting upwardly from the bottom of the lower casing member 63, and gear 83 is supported on top of a similar sleeve 85. Gear 82 is deeper than gear 83 and the lower portions of its teeth engage the worm 81, while the upper portions of its teeth engage those of the gear 83, the teeth of gear 83 being located wholly above the motor shaft worm. An anti-friction thrust bearing 86 is interposed between the upper edge of the sleeve 84 and the lower face of gear 82, as shown in Fig. 11. Within the interior of the gear 82 and driven thereby is a sleeve or socket member 87 by means of which one of the agitators F is driven. This socket member has a long cylindrical downwardly facing socket squared at its lower end portion, as shown at 88, to receive the squared portion 89 on the shank 90 with which each of the agitators F is provided. Above the square portion 89 the shank 90 is reduced to present a smaller cylindrical portion 91 extending upwardly into the socket member 87 and retained removably therein by a retaining device of any desired form. The retaining device may be constituted, for example, by a ball 92 acted upon by a spring 93 embracing the socket member, said ball 92 being adapted to engage an annular groove 94 in the extension 91 of the agitator shank.

Figure 15:
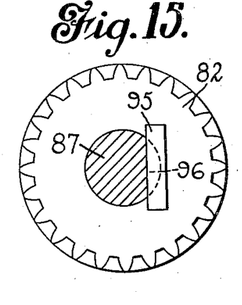
Fig. 15 shows the manner of locking one of the helical gears to the sleeve to be driven thereby.
Figure 16:
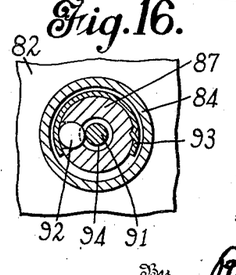
Fig. 16 is a section on line 16—16 of Fig. 11.
Figure 17:
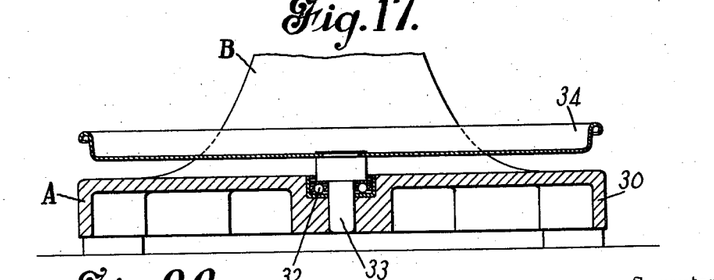
Fig. 17 is a section on line 17—17 of Fig. 1, showing the mounting of the turntable.

The gear 82 and the socket member 87 are keyed together so that the socket member is rotated by the gear, by means of a tangential key 95 engaging a tangential notch 96 in member 87, and also engaging a recess in the gear at the upper face of the gear, as shown more particularly in Figs. 11 and 15. This method of keying together the gear and socket member insures the proper drive of the socket member, and on the other hand makes the assembly of the parts as shown in Fig. 11 very convenient.

The gear 83 is provided with an interior socket member 87ᵃ similar to socket member 87 and arranged in substantially the same manner as previously described for driving the shank 90 of the other agitator F. By the gearing described the beaters or agitators are driven in opposite directions, the blades of one agitator being moved into the spaces between those of the other agitator. Either or both of the agitators may be removed by exerting a slight downward pull thereon and these agitators can readily be placed in position in their sockets as it is merely necessary to push them up into the sockets until the spring pressed members engage the grooves 94.

On the upper end of the socket member 87 of gear 82 is formed an integral diametrical rib or key 97, and on the upper end of socket member 87ᵃ of gear 83 is a similar rib or key 98. The key 97 forms one part of a clutch for transmitting motion to a reamer shaft 99. It is preferred to form the key 97 on member 87 and to groove the lower end of the reamer shaft 99 diametrically, as shown at 99ᵃ, so that it may be non-rotatably engaged by the key, but of course this and other details are susceptible of considerable variation. The reamer shaft 99 is vertically disposed and is journaled in the upper housing section E², previously mentioned. This housing section E² is in turn made in two parts which are separable from each other, namely, a base part 100 having a base plate 101, and an upper part 102, the parts 100 and 102 being interconnected by suitable screws. The reamer shaft has a long upper bearing in part 102 and a somewhat shorter bearing in part 101, and is provided intermediate of its ends with a worm 103 meshing with helical gear 104 keyed to a horizontal longitudinally extending power shaft 105, the forward end of which extends into the power socket I and is adapted to be connected to the shafts of various appliances such as meat grinders, coffee grinders, and the like. It is preferred to provide the forward end of the power shaft 105 with a diametrical notch 106 adapted to be engaged by a diametrical rib on the shaft 107 of a meat grinder or the like. The power socket I extends forwardly from the gear housing associated with the motor, and preferably its forward end terminates at approximately the same point where the housing portion E¹ terminates. The power socket I has a forwardly facing cylindrical wall provided on one side with a clamping screw 108 adapted to clamp in position the sleeve 107ᵃ on casing 107ᵇ of the food chopper or like appliance, such appliance being provided at the opposite side with a pin, not shown, adapted to engage a slot 109 at the opposite side of the socket so as to prevent rotation of the appliance in the socket.

The screws for fastening together the parts 100, 102 of the upper housing section are preferably located at opposite sides of the power shaft 105, certain of said screws being in front of the gear 104, as shown at 110, and the others being at the rear of said gear, as shown at 111.

The base plate 101 of the gear housing section E² is removably secured to the top member of the housing section E¹. For this purpose we may employ screws 112 which not only have the function of securing the two housing sections together, but also secure together the two parts of the lower housing section E¹, as shown by the dotted lines in Fig. 1. The tapped holes in the lower section of the combined motor and gear case which receive these screws 112 are shown at 113 in Fig. 14. These holes are in lugs projecting inwardly from the curved front end portion 114 of this section. The base plate 101 is also secured in position on the lower gear housing section by screws 115, as shown in Fig. 4, passing through holes 116 in lugs 117 at the rear corners of the base plate. These screws 115 extend into tapped sockets 118 in the upper section 64 of the motor and gear case. The key 98 on the upper end of socket 87ᵃ extends into a clearance recess 119 in the housing section E², this recess leading upwardly from the lower face of the base plate 101.

Figures 8, 9:
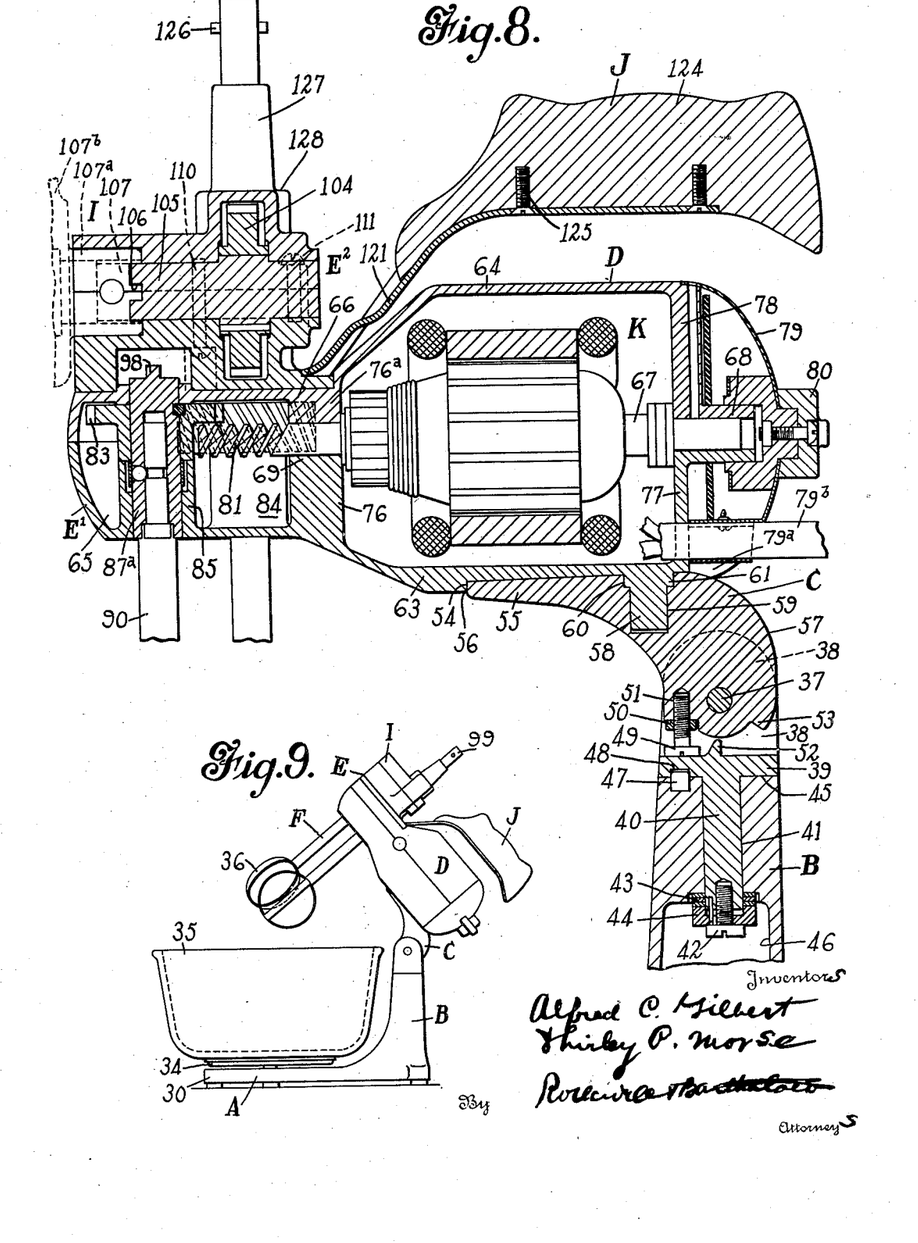
Fig. 8 is an enlarged vertical section on line 8—8 of Fig. 2.
Fig. 9 is a side elevation of the device on a small scale showing the beaters raised up out of the bowl.

The handle J previously mentioned is secured to the base plate 101 of housing section E². Preferably we use screws 120 for attaching the front end of the handle shank to the rear portion of the base plate 101, as shown in Fig. 4. Preferably the shank of the handle J comprises a sheet metal plate 121 having a flange portion or lip 122 at its front extremity lying against the upper surface of base plate 101, and from the lip 122 the plate 121 extends upwardly and rearwardly, as shown in Fig. 8, said plate being somewhat narrowed at its upper portion, as shown at 123, and having a grip or handle member proper 124, which may be conveniently formed of bakelite or other suitable material, applied to its upper surface by means such as the screws 125. It will be noted that while the handle structure is attached to the upper gear housing E², the grip member extends in general parallelism with the motor in a location somewhat above the motor so that the fingers of the operator grasping the grip member may be accommodated in the space between the upper surface of the motor casing and the lower surface of the handle member.

The upper extremity of the reamer shaft 99 is suitably secured to the reamer member G by means such as a cross-pin 126 carried by the upper end of the reamer shaft. The juice collecting bowl H surrounds the reamer in the usual location and is removably held in position on the housing section E². The bowl is adapted to be placed about a sleeve 127 projecting upwardly from housing section E² around the reamer shaft, and the bowl rests against a shoulder 128 at the base of the sleeve 127. After the reamer has been removed from the upper end of the reamer shaft, bowl H can be readily lifted off of its supporting structure. When the juice collecting bowl is in position for use, as shown in Fig. 1, it is located above the power socket I and in close proximity to the same, the shank of the handle J being located in the space between the juice bowl and the upper part of the electric motor.

It will be understood that in the operation of the device for mixing and similar purposes the worm 81 on the motor shaft will drive the gear 82, which drives the rearmost agitator F, and that the gear 82 will in turn drive gear 83, which drives the other agitator F', the rotation of the beater members on the lower ends of the agitators being in opposite directions. It will also be understood that either or both of the agitators F may be used as may be desired, and that if desired both of the agitators may be removed from their operative positions in which their upper end portions extend up into the gear housing. It will also be understood that the reamer shaft 99 is rotated whenever the gear 82 is rotated, as a result of the coupling between the upper end of the gear socket member 87 and the lower end of the reamer shaft. When it is desired to obtain orange juice the juice reamer and juice collecting bowl are placed in the position shown in Fig. 1, and upon starting the motor the reamer will be started in rotation and can be used for extracting the juice of oranges. It will also be understood that the reamer shaft, which is rotated at all times during the operation of the motor, is utilized to drive at the required low speed through the worm 103 and the helical gear 104, the power shaft 105, to the forward end of which any of a number of accessory appliances such as food choppers, coffee grinders, etc., may be attached. The power socket is very conveniently located in a position at the overhanging end of the motor where it is quite accessible, and it is convenient to have the power shaft longitudinally directed with reference to the motor and above the gears which drive the agitators. It will be observed that the power shaft is fairly close to these gears. The drive from the motor shaft to the power shaft through gear 82, shaft 99, worm 103, and helical gear 104 is very efficient.

It will be observed that in accordance with our improvements the base A is provided with but a single socket for receiving a mixer bowl turntable, this socket being substantially in the longitudinal axis of the base structure, and that the agitators F may be readily moved to a number of different positions in the mixing bowl, in order that in a given case the agitators may occupy the position in the bowl which is considered most convenient or most efficient. The motor structure can be swung to the left relatively to its supporting structure into the position shown in Fig. 6. In this position the agitators are located between the center of the bowl and the left-hand portion of the side wall of the bowl. In this position the rotation of the agitators in the body of material held in the bowl will cause the bowl to be rotated in the direction of the arrow (Fig. 6). In some cases it will be satisfactory to have the agitators operate in approximately the central portion of the bowl, as in the case of the adjustment shown in Fig. 4. In other cases it may be desirable to swing the motor structure to the right of the position shown in Fig. 4 to the position shown in Fig. 7. When the parts are in the position shown in Fig. 7 the rotation of the agitator blades in the body of material in the bowl will cause the bowl to be rotated in the direction of the arrow (Fig. 7), which is the opposite direction of rotation from that in the case of Fig. 6.

Figure 5:
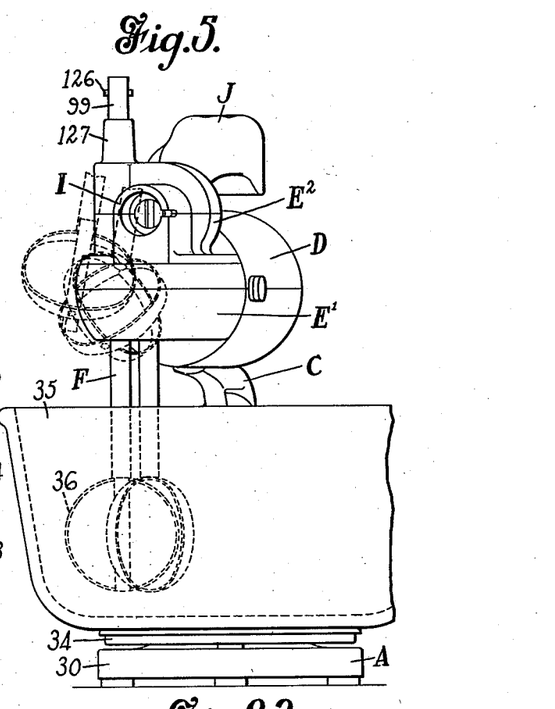
Fig. 5 is a front end elevation of the device as exhibited in Fig. 2 but showing the agitators swung to one side of the mixing bowl.

When the mixing or beating has been completed, or is temporarily completed, the agitators can be moved upwardly to the position shown in Fig. 9 by upward tilting of the motor about the pivot 37. The stop elements 52, 53 will arrest the motor in the position shown in Fig. 9. Ordinarily in a device of this class the motor in being tilted moves in a vertical plane, and when the beater elements of the agitators reach their uppermost position they obstruct the mixing bowl. For this reason subsequent operations, such as the addition of ingredients to the mixture, are interfered with. In our improved device we overcome this drawback or at least remedy it to a large extent by providing a structure in which the agitators as they are lifted are moved to one side. It is for this reason that the pivot of the motor bracket is inclined at an angle to the horizontal. The result of this arrangement is that upon tilting of the motor structure the agitators as they move upwardly at the same time move laterally relatively to the bowl. The uppermost position of the beater elements is shown in Fig. 5 in dotted lines, and it will be seen from Fig. 5 that this position is laterally and outwardly disposed with respect to the bowl as compared with the corresponding lowermost position of the beaters. In practice the position of the motor shown in Fig. 6 will be utilized more frequently than that shown in Fig. 7, and it will be understood that this feature of providing for the lateral shift of the beaters as they are lifted is of particular convenience when the motor structure is in the so-called left-hand position shown in Fig. 6. In mixing devices of this general class it is common to provide the mixing bowl with a wall which is somewhat upwardly and outwardly inclined, and of course such an arrangement permits the lateral shifting of the beaters as they are lifted so that the beaters in moving upwardly may follow the inclination of the side wall of the bowl. This result is achieved in our device as the inclination of the motor bracket pivot to the horizontal is such as to cause the beaters when tipped up from the position shown in Fig. 6 to the uppermost position shown in Fig. 5 substantially to follow the inclination of the mixer bowl wall. As the lifting beaters move in substantial parallelism to the bowl wall, their upper position is one in which free access to the bowl from above is permitted. This feature is also of advantage when the motor is located in the longitudinal axis of the base as the lift of the beaters carries them to one side of the bowl.

It will be understood that the motor unit can be readily detached from the pedestal when it is desired to carry the motor unit in the hand and employ it as a portable device adapted for mixing while held in the hand of the operator. Fig. 21 shows the appearance of this portable unit. The motor unit can be removed from the pedestal with the greatest ease as it is merely necessary to lift it in a vertical direction by means of its handle J. The pin on one of the parts entering a socket on the other part and the tongue and groove connection associated with the pin, as described, provide a very effective means for holding the motor unit against any undesirable displacement while at the same time permitting the motor unit to be lifted off of the pedestal instantly when this is desired without the necessity of making any disconnections. The separable connection is preferably made between the bracket portion on the pedestal and the lower face of the motor casing, but variations might be made in this respect.

One of the advantages of our structure resides in the ease with which the device can be assembled and taken apart for repairs, if repairs are necessary. It is a distinct advantage to provide a combined casing for the motor and for at least part of the gear mechanism. It is a very considerable advantage to split the combined motor and gear casing lengthwise so that when the parts of the casing are separated all of the interior mechanism is readily accessible. It is also a distinct advantage to apply the housing carrying the reamer shaft removably to the upper part of the lower gear housing, as described, the connection being such that when the upper housing and the lower housing are brought together for assemblage, the reamer shaft will be brought into clutching relation to the gear element from which it is driven. All of the parts are quite readily accessible for any adjustments which may be required.

It is a distinct advantage to have the agitators movable relatively to the mixing bowl by a swinging movement of the motor unit so that the agitators can be quickly and conveniently brought to the desired position for operation. It is also a distinct advantage to provide stop means for limiting the swinging movement of the motor unit relatively to the base and to the bowl carried by the base so that the swing of the agitators will be arrested before said agitators come into contact with the side wall of the bowl, which would be undesirable. By our improvements we provide a construction in which the agitators cannot be swung into contact with the wall of the bowl 35 either at one side or at the other side. While the mixer bowl and its contents are in rotation the agitators can be swung so as to move them nearer to or farther from the center of the bowl, as may be considered desirable, and this is a feature of advantage. Naturally it is possible to use bowls or receptacles of different sizes on the base portion 30 or on the removable turntable 34, and the swinging mounting of the agitators permits the device to be accommodated readily to the size and/or location of the receptacle employed.

Figure 23:
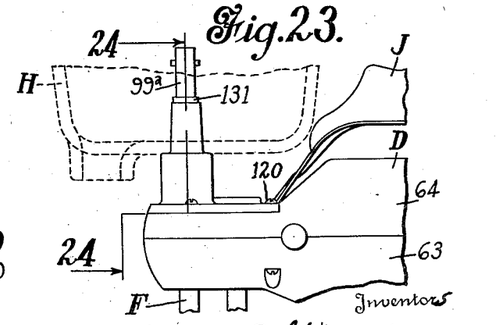
Fig. 23 is a partial side elevation of a modified form of device.
Figure 24:
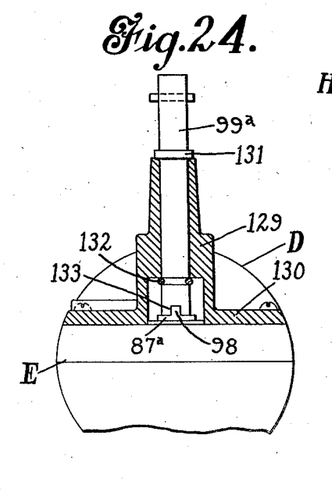
Fig. 24 is a section on line 24—24 of Fig. 23.

In Figs. 23 and 24 we have shown a modified form of device in which the power shaft is omitted. In this form there is a reamer shaft 99ª mounted in a housing 129 having a bottom plate 130 secured to the upper member 64 of the combined motor and gear case in substantially the same manner as the housing section E² previously described. In this form the reamer shaft has a thrust collar 131 at the top and a retaining ring 132 near its lower end. The lower end of the shaft is notched or grooved as shown at 133 so as to provide for the drive of said shaft from the gear mechanism within the housing E¹. However, it will be noted that whereas in the first case described the reamer shaft was coupled to and driven from the gear 82, in the instance now under consideration the reamer shaft is coupled to and driven from the outermost gear, that is to say, the gear 83. In this case the key 98 on the socket member 87ª engages the groove in the reamer shaft. It will be understood that the housing 129 and the housing E² are interchangeable, the first being employed when a power shaft is not desired, and the second being employed when it is desired to have, in addition to the reamer, the power shaft for driving food choppers and like appurtenances. It will also be noted that where the casing 129 is employed the handle is secured to the rear edge of this casing by the same screws 120 which are used to attach the handle to the plate 101. It will be seen from Fig. 23 that as the reamer shaft is associated with and driven from a different gear than in the case first described, the juice collecting bowl H will in this case be located somewhat farther to the front of the device than in the form shown in Fig. 1.

Various changes can be made in the details of the structure herein described without departing from the principles of our invention. We have selected two embodiments only for illustration and description, but it will be evident that many modifications and changes may be made within the scope of our invention as defined in the claims. We have not attempted to show or describe all possible modifications.

What we claim is:

1. In a device such as described, the combination of a motor having a horizontal shaft, a worm on the motor shaft, a gear engaging and driven from the worm and of greater depth than the worm, a second gear engaging and driven from the first and of less depth than the first and engaging the first gear in a zone offset from the zone of engagement of said worm with said first gear, a casing surrounding said worm and said gears, agitator devices depending from said casing and driven by said gears, a reamer shaft extending upwardly from said casing and driven by one of said gears, a reamer on the upper end of said reamer shaft, and a power shaft above said casing driven from said reamer shaft.

2. In a device such as described, the combination of a motor having a horizontal shaft, a worm on the motor shaft, a gear engaging and driven from the worm and of greater depth than the worm, a second gear engaging and driven from the first and of less depth than the first and engaging the first gear in a zone offset from the zone of engagement of said worm with said first gear, a casing surrounding said worm and said gears, agitator devices depending from said casing and driven by said gears, a reamer shaft extending upwardly from said casing and driven by one of said gears, a reamer on the upper end of said reamer shaft, a power shaft above said casing, said reamer shaft being vertically disposed and said power shaft being horizontally disposed, and gearing connecting the intermediate portion of the reamer shaft with the power shaft so that the latter is driven therefrom.

3. In a device such as described, a combined motor and gear casing divided longitudinally into upper and lower sections along a horizontal plane parallel to the motor shaft, said sections having an upright transverse partition dividing the casing into a motor compartment and a gear compartment, a motor in the motor compartment having a horizontal shaft extending through the partition into the gear compartment, a worm on said shaft within the gear compartment, a gear engaging and driven from the worm and having a substantially vertical axis and a toothed face of greater depth than the worm, a second gear engaging and driven from the first and of less depth than the first and having teeth engaging those of the first gear in a zone offset from the zone of driving engagement of said worm with said first gear, and depending agitator devices driven by the respective gears.

4. In a device such as described, a combined motor and gear casing divided longitudinally into upper and lower sections, said sections having a partition dividing the casing into a motor compartment and a gear compartment, a motor in the motor compartment having a shaft extending through the partition into the gear compartment, a worm on said shaft within the gear compartment, a gear engaging and driven from the worm and of greater depth than the worm, a second gear engaging and driven from the first and of less depth than the first and engaging the first gear in a zone offset from the zone of engagement of said worm with said first gear, and depending agitator devices driven by the respective gears said agitator devices comprising shanks whose upper extremities extend upwardly into the gear compartment and within said gears.

5. A kitchen utility device comprising a base, a pedestal on the base, a bracket pivoted to the pedestal, a combined motor and gear case mounted on the bracket, said motor and gear case being divided longitudinally into a lower section and an upper section and being divided transversely into a motor compartment and a gear compartment, a motor in said motor compartment, horizontal gears in the gear compartment, depending agitators coupled to and driven from the respective gears, a reamer shaft extending upwardly from the casing and driven from one of said gears, said reamer shaft having a worm intermediate of its ends, a power shaft having a gear intermediate of its ends engaging and driven by said worm, and an outlet socket associated with said power shaft and having facilities for connecting various power-driven appliances to the power shaft, said power shaft being horizontally arranged and located above the motor shaft.

6. In a mixing apparatus, a base, a bowl mounted on said base for free rotation thereon, a duplex rotary beater extending into said bowl, an upwardly and downwardly tiltable motor above the beater for driving the same, a pedestal rising from the base, and a support for the beater and motor comprising a bracket swiveled on the pedestal at the upper end portion of the latter to move about a substantially vertical axis and adapted to be swung freely to move the duplex beater into different beating positions which the beater may occupy within the bowl, said beater being adapted to operate in a position centrally of the bowl or in positions at opposite sides of the center respectively, in which the latter positions the beater is at one side or the other of said pedestal.

7. In a mixing apparatus, a base, a bowl mounted on said base for free rotation thereon, a rotatable stirring device extending down into said bowl, a motor for rotating said stirring device, a pedestal rising from said base, a support for the stirring device swiveled on said pedestal at the upper portion thereof so that the stirring device is movable laterally into different portions of the bowl as desired in order to operate in any of those positions, and a stop associated with the upper portion of the pedestal and coacting with said support for limiting the movement of the stirring device in a lateral direction so that it cannot contact the bowl wall.

8. In a mixing apparatus, a base, a turntable mounted on said base, a bowl mounted in said turntable, a duplex rotary beater extending down into said bowl, a motor for operating said beater, a pedestal rising from the base, a support for said motor and beater swiveled to said pedestal so that the beater can be swung laterally into different operative positions within the bowl, means mounting the motor and beater on said support so that they are free to tilt in order to move the beater into and out of said bowl, and means associated with said pedestal for limiting the movement of said support relatively to the pedestal so as to limit the swing of the beater and prevent it contacting with the side wall of the bowl.

9. In a device such as described, the combination of a base, a pedestal rising therefrom, a platform swiveled in the upper end portion of the pedestal, a fork projecting upward from the platform, a bracket pivoted in the fork, a motor secured to the bracket, a gear case carried by the end of the motor opposite the pedestal and containing gearing driven from the motor shaft, agitators depending from the gear case and adapted to stir the contents of a receptacle supported on the base, and means for limiting the turning movement of the platform and preventing the agitators from contacting the side wall of the receptacle.

10. In a device such as described, a motor and gear member having depending agitators, and a supporting pedestal for said member, said member having a handle by which it can be lifted, the axis of said member being horizontally disposed, the lower part of said member and the upper part of said pedestal having cooperating interengaging means preventing the member from being moved translatively or rotarily in a horizontal plane relatively to the pedestal but permitting said member to be lifted vertically from the pedestal, said cooperating means comprising a projection on one part adapted to engage a socket on the other part and a tongue on the socketed part adapted to engage a groove or mortise on the part carrying the projection, said tongue lying substantially at right angles to said projection.

11. In a device such as described, the combination of a motor having a horizontal shaft, a worm on said shaft, a gear engaging and driven from the worm and of greater depth than the worm, a second gear engaging and driven from the first and of less depth than the first and engaging the first gear in a zone offset from the zone of engagement of said worm with said first gear, a housing section enclosing said worm and said gears, agitator devices depending from said housing section and driven by said gears, an upwardly extending reamer shaft driven by one of said gears, a housing section enclosing said reamer shaft and in which the same is mounted, means detachably connecting said reamer shaft with its driving gear, and means detachably connecting the second housing section to the first whereby the reamer shaft and its housing section are removable together from the assembly.

12. In a device such as described, the combination of a horizontal motor, a worm on the motor shaft, a pair of gears driven by the worm and having vertically disposed axes, a housing section enclosing said worm and said gears and connected to the casing of the motor, agitator devices driven by said gears and depending from said housing section, a second housing section above the first and separably connected therewith, a reamer shaft and a power shaft carried by said second housing section and driven by one of said gears, and means detachably connecting said reamer shaft with its driving gear, said reamer shaft and power shaft being mounted in said second section and removable with said section when and as it is removed from the first section.

13. In a household utility device, a motor and gear member having depending agitators, and a supporting pedestal for said member, said member having a handle by which it can be lifted, the axis of said member being horizontally disposed, said member and pedestal having cooperating interengaging means preventing the member from being disengaged or dislocated in a horizontal plane relatively to the pedestal but permitting said member to be lifted vertically from the pedestal, said cooperating means comprising a substantially vertical projection on said member adapted to engage a socket in the pedestal, and a substantially horizontal tongue on the pedestal adapted to enter and fit a horizontal groove in the pedestal when said member is lowered vertically onto the pedestal, said tongue lying in front of and adjacent said socket.

14. In a household utility device, a motor and gear member having depending agitators, a supporting pedestal, a bracket on the pedestal adapted to tilt up and down, said member having a handle by which it can be lifted, the axis of said member being horizontally disposed, the lower portion of said member underneath the motor portion thereof, and the upper surface of said bracket, having cooperative means preventing the motor member from being shifted laterally or longitudinally but permitting the motor member to be separated freely at all times from the bracket by a vertical lift.

15. In a household utility device, a motor and gear member having depending agitators, a supporting pedestal, a bracket on the pedestal adapted to tilt up and down, said member having a handle by which it can be lifted, the axis of said member being horizontally disposed, the lower portion of said member underneath the motor portion thereof, and the upper surface of said bracket, having cooperative means preventing the motor member from being shifted laterally or longitudinally but permitting the motor member to be separated freely at all times from the bracket by a vertical lift, said cooperating means comprising a downward projection on the motor member adapted to engage a socket in the bracket, and a tongue on the bracket adapted to engage a groove in the motor member casing at its outer surface.

16. In a kitchen utility device, the combination of a base, a turntable on the base, a bowl on said turntable, said bowl having an upwardly and outwardly inclined side wall, a pedestal rising from the base back of the bowl, an agitator extending down substantially vertically into the bowl, a motor for driving the agitator and movable therewith, a mounting for the motor on the pedestal including provisions whereby the motor can be swung on an upright axis to carry the agitator from one side of the bowl to the other to vary the operative position of the agitator and the lower or agitating portion of the agitator swung upwardly relatively to the bowl along a slanting line in a direction substantially parallel to the inclined side wall of the latter at one side of the pedestal and laterally of the pedestal, and means associated with the pedestal for preventing contact of the agitator with the bowl while at either side of the bowl.

17. In a kitchen utility device, a base, a turntable on said base, a bowl on said turntable having an upwardly and outwardly inclined side wall, an agitator extending down into the bowl, a pedestal rising from the base, a motor for driving said agitator and movable therewith, and provisions for mounting said motor on said pedestal so that the agitator can be moved from the central portion of the bowl to either side and can be withdrawn upwardly from the bowl in a direction substantially parallel to the inclined side wall of the latter, said provisions including a pivot member for the motor whose axis is directed at a slight angle to a horizontal plane.

18. In a device such as described, a horizontal motor member having a gear housing at one end, agitators depending from said gear housing, a base, a motor supporting pedestal rising from the base, said motor member and pedestal having cooperating means preventing the displacement of said motor member but permitting the same to be lifted off of said pedestal, a reamer shaft extending upwardly from said gear housing, a reamer shaft housing connected with the gear housing at the upper part of the latter and extending upwardly therefrom, and a handle member by which the motor member can be lifted from the pedestal, said handle member comprising a substantially horizontally disposed grip member spaced above and located adjacent the rear portion of the motor member having a rearwardly projecting free rear end portion and a flat relatively wide and thin shank member extending forwardly and downwardly from the front end of the grip member and secured to the gear housing rearwardly of the reamer shaft housing.

19. In a device such as described, a motor member having a horizontal shaft, a gear case at one end of said motor member having a flat top portion, a pair of agitator driving gears in said gear case driven from the motor shaft and having vertical axes, one of said gears having a hub member extending upwardly out of said gear case, a housing section removably secured to the top of the gear case, a reamer shaft journaled in and carried by said housing section, the hub member of said gear and said reamer shaft having interengaging coupling parts adjacent the top of the gear case which are brought into coupling engagement by the assembly of the housing section on the gear case whereby the reamer shaft is driven from said gear, said reamer shaft having a worm intermediate of its ends, a horizontal power shaft journaled in said housing section and having a gear engaging and driven from said worm, and a socket member associated with one end of the power shaft providing for the connection of various accessory appliances to said shaft.

20. In a device such as described, the combination of a motor member having a horizontal shaft, a gear case at one end of said motor member, gears in said gear case having upright axes, means for driving said gears from the motor shaft, said gear case having a flat top, said gears having hub members therein projecting upwardly beyond the top of the gear case and having projecting diametrical coupling keys, a housing section detachably secured to the top of the gear case and having a reamer shaft with a notch in its lower end engaging the coupling key of one of said gears to drive said reamer shaft, and another housing section adapted to be applied to the top of said gear case in place of said first section and having a reamer shaft whose lower end is notched and adapted to engage the key of the other gear so as to be driven by said other gear, one of said housing sections being provided in addition to the reamer shaft with a power shaft geared to and driven from said shaft.

21. In a device such as described, the combination of a motor member having a horizontal shaft, a gear case at one end of the motor member having a flat top, gears in said gear case having upright axes and arranged side by side, means for driving said gears from the motor shaft, hubs for the respective gears projecting upwardly out of the gear case and having coupling members at the ends thereof, a housing section adapted to be applied to the top of said gear case and having a coupling member adapted to be coupled to one of said gear coupling members when said housing section is assembled on the gear case, and another housing section adapted to be substituted for the first having a shaft with a coupling member associated therewith adapted to be coupled to the coupling member of the other gear when said second housing section is assembled with said gear case, and one of said gear coupling members being at a greater distance from the motor member than the other.

22. In a device such as described, the combination of a base, a turntable mounted thereon, a bowl mounted on the turntable, a pedestal rising from the base back of the bowl, a motor member having driven depending agitators with overlapping paths of rotation, said agitators adapted to extend downward into said bowl, a bracket by means of which said motor member is mounted to tilt upwardly and downwardly, a device associated with the upper end of the pedestal to which said bracket is pivoted for tilting, the pivot of said bracket being included so that as the motor member is tilted upwardly it moves at the same time laterally of the bowl and pedestal to a certain extent whereby the agitators when located adjacent the bowl wall at one side of the pedestal are moved outwardly relatively to the longitudinal axis of the device during their upward movement, said device associated with the upper end of the pedestal having swiveled relation to the pedestal so that the motor member can swing laterally on a substantially upright axis in order to locate the agitators adjacent one or the other side of the bowl, and stop means associated with the pedestal and with the device by which said bracket is swiveled, said stop means acting to prevent the agitators from contacting with the bowl wall at either side of the bowl.

23. In a device such as described, the combination of a base, a turntable on said base, a bowl on said turntable, a pedestal rising from the base back of the bowl, a motor member having a depending agitator adapted to extend downward into said bowl, a bracket connected to the motor member at the under portion thereof, a device swiveled to the upper end portion of the pedestal to turn in a horizontal plane, stop means associated with the pedestal and with said device for preventing the agitator from contacting with the bowl wall at either side of the bowl, and a pivotal connection between said device and said bracket whereby the motor member can be tilted up and down, said connection including a pivot member inclined to the horizontal so that when the agitator is located at one side of the bowl and tilted upwardly it has an outward movement relatively to the bowl and laterally of the pedestal.

24. In a kitchen utility device, a base, a bowl mounted on the base, a pedestal rising from the base, a motor pivoted to the pedestal on an axis directed at a slight angle to a horizontal plane, and agitators supported by the motor and driven from the shaft thereof and extending downwardly into the bowl.

ALFRED C. GILBERT.
SHIRLEY P. MORSE.